(12) United States Patent
Messing et al.

(10) Patent No.: US 7,370,624 B2
(45) Date of Patent: May 13, 2008

(54) PISTON ENGINE WITH INTEGRATED BALANCE SHAFTS

(75) Inventors: Michael Messing, Steyr (AT); Roland Marzy, Steyr (AT); Ronald Penzinger, Steyr (AT)

(73) Assignee: Magna Powertrain AG & Co. KG, Lannach (AT)

( * ) Notice: Subject to any disclaimer, the term of this patent is extended or adjusted under 35 U.S.C. 154(b) by 0 days.

(21) Appl. No.: 10/581,462

(22) PCT Filed: Dec. 2, 2004

(86) PCT No.: PCT/AT2004/000425

§ 371 (c)(1),
(2), (4) Date: Aug. 10, 2006

(87) PCT Pub. No.: WO2005/054643

PCT Pub. Date: Jun. 16, 2005

(65) Prior Publication Data

US 2007/0095166 A1    May 3, 2007

(30) Foreign Application Priority Data

Dec. 2, 2003   (AT) .............................. GM854/2003

(51) Int. Cl.
*F02B 75/06* (2006.01)
(52) U.S. Cl. .................................................. 123/192.2
(58) Field of Classification Search ............... 123/192.2
See application file for complete search history.

(56) References Cited

U.S. PATENT DOCUMENTS

| 4,300,493 | A | | 11/1981 | Berti |
|---|---|---|---|---|
| 4,509,474 | A | * | 4/1985 | Schmuck ................. 123/192.2 |
| 4,694,789 | A | * | 9/1987 | Frost ........................ 123/90.17 |
| 4,712,436 | A | * | 12/1987 | Brown ............................ 74/44 |
| 4,781,156 | A | * | 11/1988 | Berger et al. ............ 123/192.1 |
| 5,522,747 | A | * | 6/1996 | Kirschey ...................... 440/83 |
| 5,947,074 | A | * | 9/1999 | Yapici ...................... 123/192.2 |
| 6,286,474 | B1 | | 9/2001 | Downs et al. |
| 2003/0075136 | A1 | | 4/2003 | Inaba et al. |
| 2003/0145821 | A1 | | 8/2003 | Hashimoto et al. |

(Continued)

FOREIGN PATENT DOCUMENTS

DE           2935384 A1        3/1981

(Continued)

*Primary Examiner*—Stephen K. Cronin
*Assistant Examiner*—Jason Benton
(74) *Attorney, Agent, or Firm*—Harness, Dickey & Pierce, P.L.C.

(57) ABSTRACT

A piston engine with a compensation shaft unit, wherein a window surrounded by a flange is provided on the crankcase thereof. The flange forms a separating surface to which the housing of the compensation shaft unit is fixed by means of screws. In order to ensure clean, toothed-wheel engagement for the compensation shafts, which are integrated into the housing, and easy assembly, the compensation shaft is provided with a toothed wheel, which protrudes through the window inside the crankcase, and which is driven by a toothed wheel, which is arranged on the crankshaft, and the housing of the compensation shaft unit has a separating surface, which can be displaced in order to adjust the amount of engagement clearance on the separating surface of the crankcase before the screws are tightened.

30 Claims, 5 Drawing Sheets

U.S. PATENT DOCUMENTS

2005/0061284 A1* 3/2005 Sato et al. ............... 123/192.2

FOREIGN PATENT DOCUMENTS

| DE | 3119362 | 12/1982 |
| DE | 3138165 A1 | 4/1983 |
| DE | 3314801 | 10/1984 |
| EP | 0 916 833 A | 5/1999 |
| EP | 0916833 | 5/1999 |
| EP | 1 304 450 A | 4/2003 |
| EP | 1 321 647 A | 6/2003 |
| FR | 2720464 A1 | 1/1995 |
| GB | 1250729 | 10/1971 |
| JP | 2003027956 A | 1/2003 |

* cited by examiner

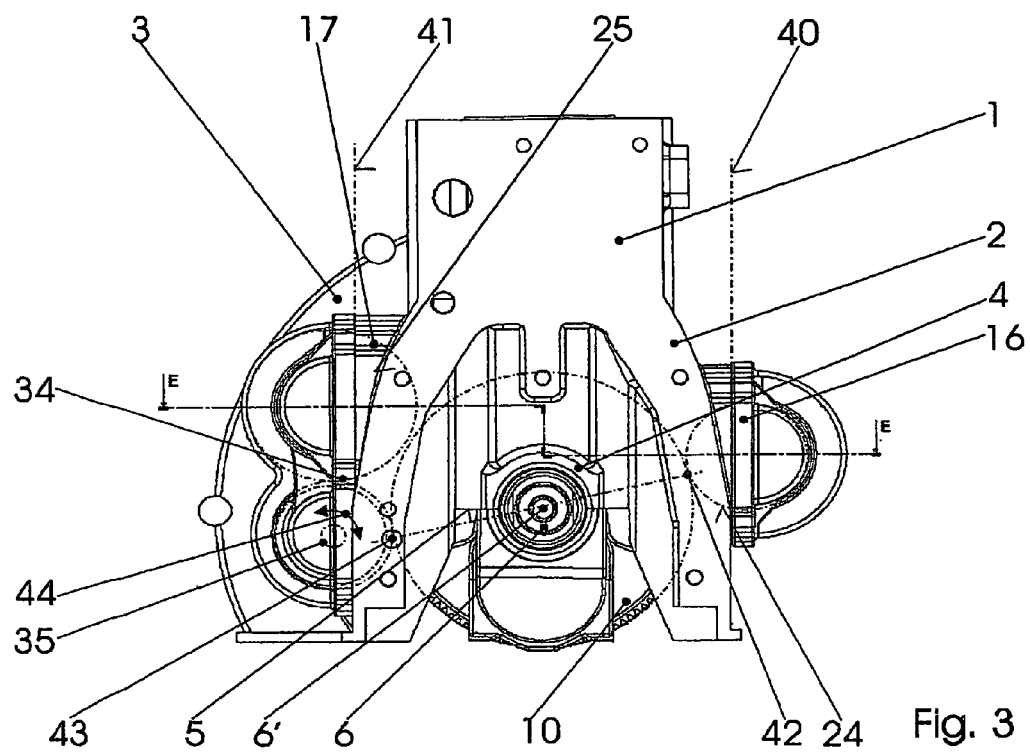
Fig. 3
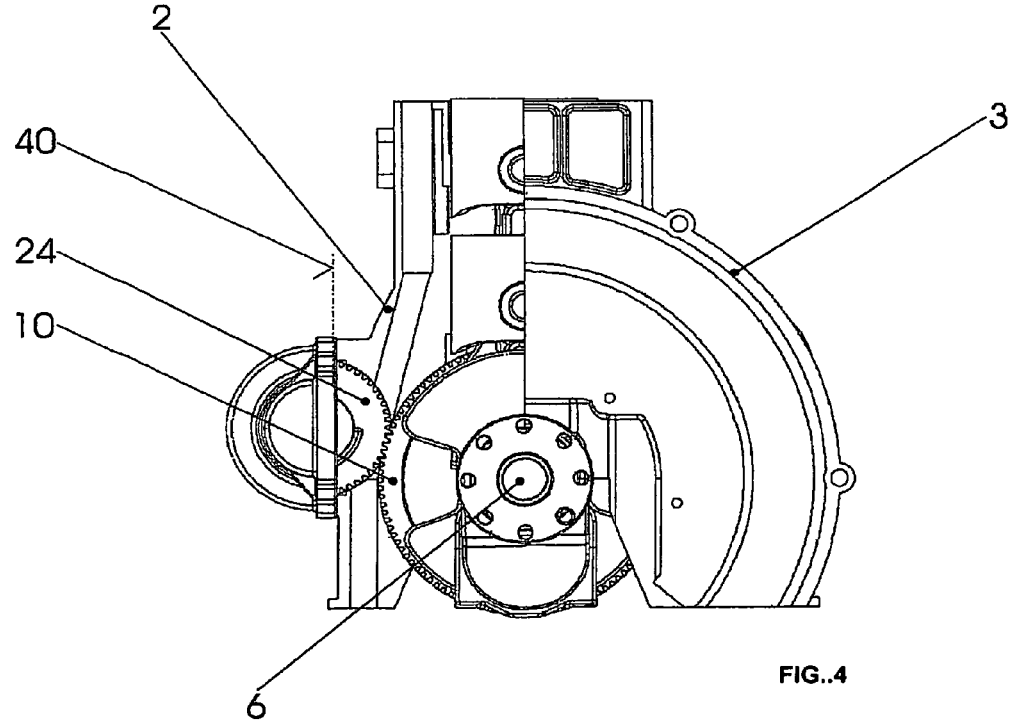
FIG..4

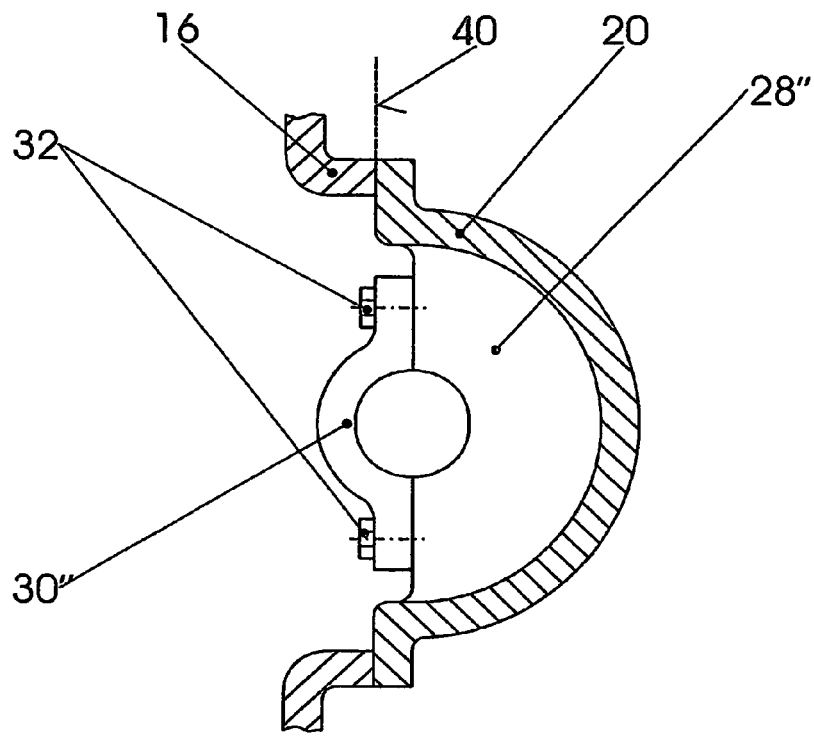
Fig. 6
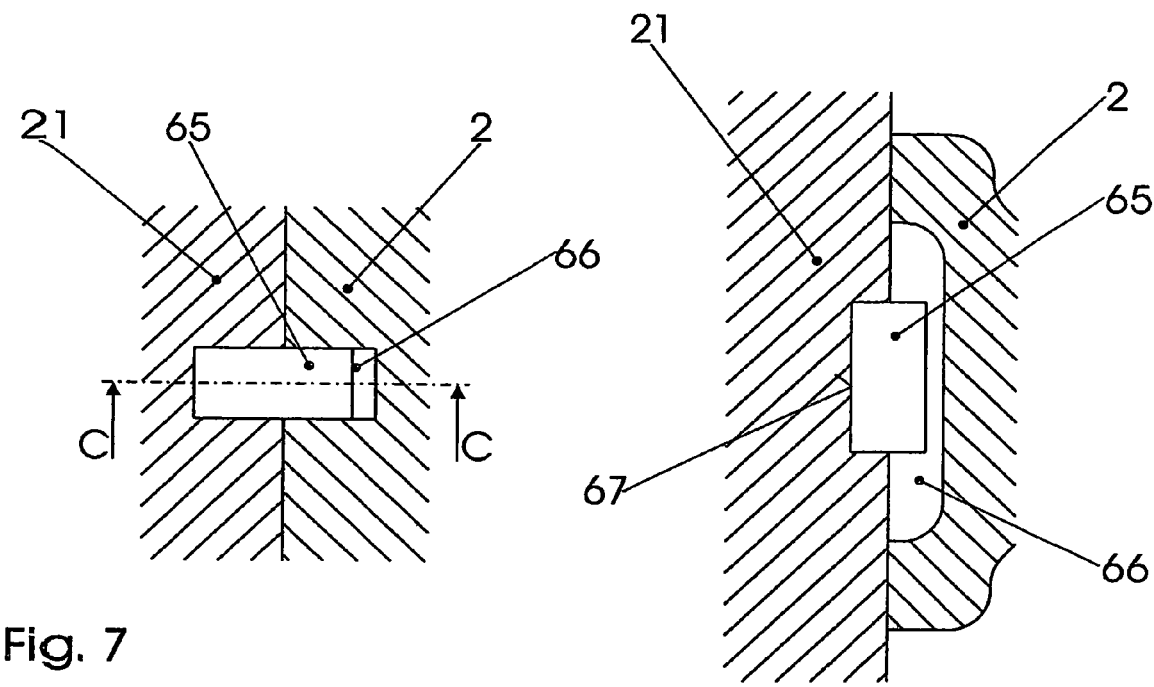
Fig. 7
Fig. 8

PISTON ENGINE WITH INTEGRATED BALANCE SHAFTS

CROSS-REFERENCE TO RELATED APPLICATIONS

This application is a National Stage of International Application No. PCT/AT2004/000425, filed Dec. 2, 2004, and which claims priority to Austrian Utility Model No. GM 854/2003, filed Dec. 2, 2003. The disclosures of these applications are incorporated herein by reference.

FIELD OF THE INVENTION

The invention relates to a piston engine comprising at least one balance shaft unit in whose crankcase a crankshaft is supported and at whose crankcase a window surrounded by a flange is provided at the side, with the flange forming a joint face to which the housing of the balance shaft unit is fastened by means of screws, with a balance shaft being supported in said housing. The piston engine is primarily considered as an internal combustion engine.

BACKGROUND OF THE INVENTION

With the internal combustion engines customary at the moment with pairwise balance shafts, a unit containing both balance shafts is connected to the crankshaft bearing from below. This has the advantage of being able to equip conventional basic engines with balance shafts without any greater construction interventions, but does increase the construction height of the engine. This is undesirable with sloping engine hoods. In the completely new design of an internal combustion engine, one therefore endeavors to integrate the balance shafts into the engine, to integrate them at the side into or onto the crankcase or the engine block (which are anyway usually integral).

What causes problems here is the installation and the drive of the balance shaft unit. It is known from DE-A-29 35 384 to support a balance shaft at the side in a cover and to drive it by means of a chain. A drive without clearance is possible thanks to a chain tensioner, but the chain makes the installation a lot more difficult.

If a balance shaft is driven by means of gears, the load case typical for balance shafts (small, but pulsing transmitted torque at a very high rotational speed) requires special measures to avoid irritating noises. A proven measure is the reduction in the tooth clearance, in particular of the rotational flank clearance, which requires a very precise setting of the shaft position. It is known from EP-B-916 833 for balance shafts with gear drive arranged pairwise beneath the crankshaft to set the whole balance shaft unit by means of rotatable eccentrics.

SUMMARY OF THE INVENTION

It is the underlying object of the invention to set forth a way for the precise setting of the gear engagement with the simplest possible installation also for balance shafts integrated in the housing. In accordance with the invention, this consists of the characterizing features a) and b) of the independent claim. The drive by means of gears allows the unit to be attached from the outside with a few hand movements, provided a setting of the tooth clearance from outside is successful. This is successful due to the planar joint faces being able to be pushed onto one another. The window into the interior of the crankcase only needs to be a little larger than the gear, whereby the structural weakening of the crankcase can be minimized.

If a balance shaft unit is provided at each side of the crankcase and the shafts should rotate at twice the crankshaft speed in the opposite sense to balance the second order inertia forces, an intermediate shaft is thus additionally supported in the housing of the second balance shaft unit with an intermediate gear which meshes with the gear of the balance shaft, on the one hand, and with a gear seated on the crankshaft, on the other hand. The gear of the balance shaft thus meshes on the one side and that of the intermediate shaft on the other side, and both with the same gear on the crankshaft.

In a preferred arrangement, the joint face encloses an obtuse angle with the connection straight line of the axes of the crankshaft and the balance shaft in a section imagined normally to the crankshaft axis. The angle may not be a right angle, because a displacement of the balance shaft unit would then not effect any change in the tooth clearance. The obtuse angle, however, results in a "ratio", whereby the tooth clearance can be set very precisely with a large displacement of the balance shaft unit and is also no longer falsified when the screws are tightened after the setting. Furthermore, the joint faces are preferably parallel to the plane of symmetry of the crankcase; this moreover simplifies the processing.

In a further development of the invention, at least one sliding guide is provided in the joint faces of the crankcase and of the housing of the balance shaft unit and permits a displacement in a plane normal to the crankshaft. This facilitates the setting and provides the assurance that the axes of the two gears meshing with one another remain parallel. A clean engagement over the whole tooth width is thus also still ensured additionally to the precisely set rotational flank clearance.

The sliding guide preferably consists of a straight groove in the sliding direction in one of the two joint faces and of a key let into the other joint face. This combines high precision with simple production.

In a preferred embodiment, the balance shaft runs around in its housing in divided bearings, with the one bearing half being formed in the housing of the balance shaft unit and the other being made as a bearing cover connected to the first bearing half. The balance shaft unit can thus be completely pre-installed and also be subjected to a test run prior to the installation. An alternative with an installed balance shaft consists of it running around in undivided bearings in its housing. The gear and the balance weights are then so-to-say "threaded on" on the installation of the shaft into the housing.

A more sophisticated aspect of the invention consists of the gear of the balance shaft being arranged at its center. The gear seated on the crankshaft is then accordingly also in the center. With a central drive, the characteristic frequency of the torsion of the balance shaft is higher and the balance shaft unit can be arranged at the longitudinal center of the engine, close to its center of gravity. The selection of the position of the balance shaft units such that the gear of the balance shaft unit and the intermediate gear of the second balance shaft unit mesh with the gear seated on the crankshaft at positions offset by 180 degrees to one another has similarly favorable effects.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be described and explained in the following with reference to Figures of a preferred embodiment of the invention. There are shown:

FIG. 3: a view from the front;
FIG. 4: a view from the rear;
FIG. 6: a section according to AA in FIG. 5;
FIG. 7: detail B in FIG. 5;
FIG. 8: a section according to CC in FIG. 7.

DETAILED DESCRIPTION OF THE PREFERRED EMBODIMENTS

Figure 1:
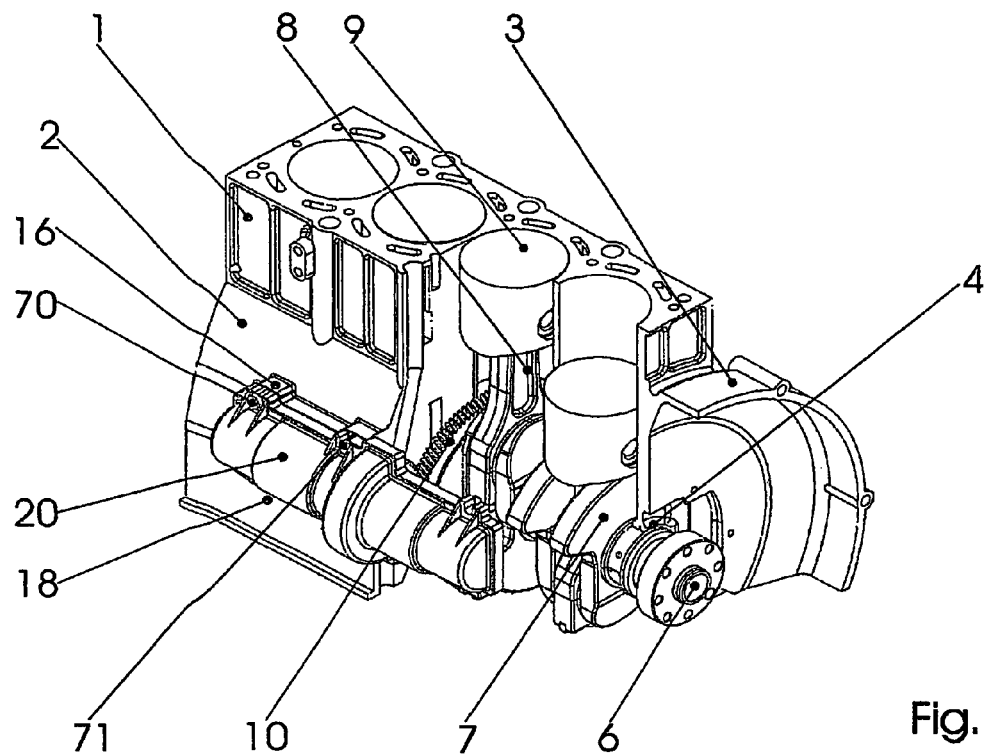
FIG. 1: an axonometric view of the internal combustion engine from the rear top left.
Figure 2:
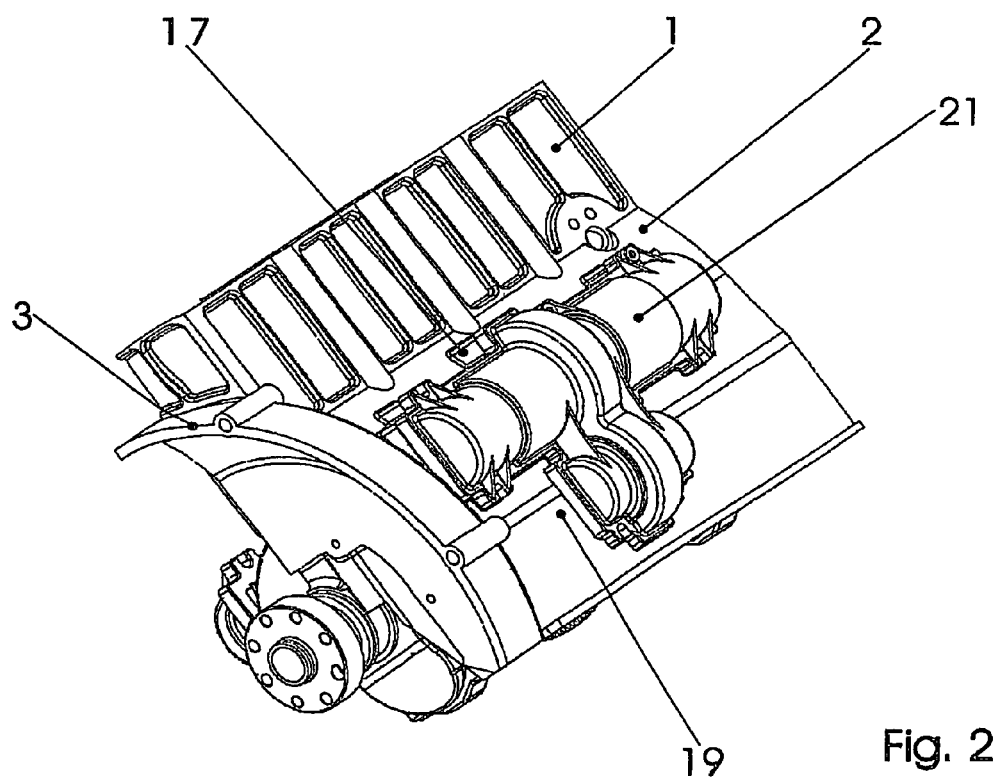
FIG. 2: as FIG. 1, from the rear bottom right.

The following description of the preferred embodiment is merely exemplary in nature and is in no way intended to limit the invention, its application, or uses.

In FIGS. 1 to 4, a four-cylinder internal combustion engine is shown in different views. In all of them, the cylinder block is designated with 1, the crankcase in sum with 2 and the flywheel housing with 3, although they are made integrally here. Five crankshaft bearings 4 are provided in the crankcase 2 and their bearing halves disposed over a joint plane 5 are in the crankcase 2. A crankshaft 6 (whose central axis is designated with 6' in FIG. 3) is journaled in said crankshaft bearings and con rods 8 connected at the other end to pistons 9 are between their crank webs 7. A gear 10 is rotationally fixedly arranged between one of the crankshaft bearings 4 and a crank web 7 and serves the drive of the balance shafts.

A flange 16 is cast on the crankcase 2 considered from the rear (from the flywheel housing 3) at the left and a flange 17 at the right and a balance shaft unit 18 and a balance shaft unit 19 are screwed to them at the left and at the right respectively (screws 70 in FIG. 1).

Figure 5:
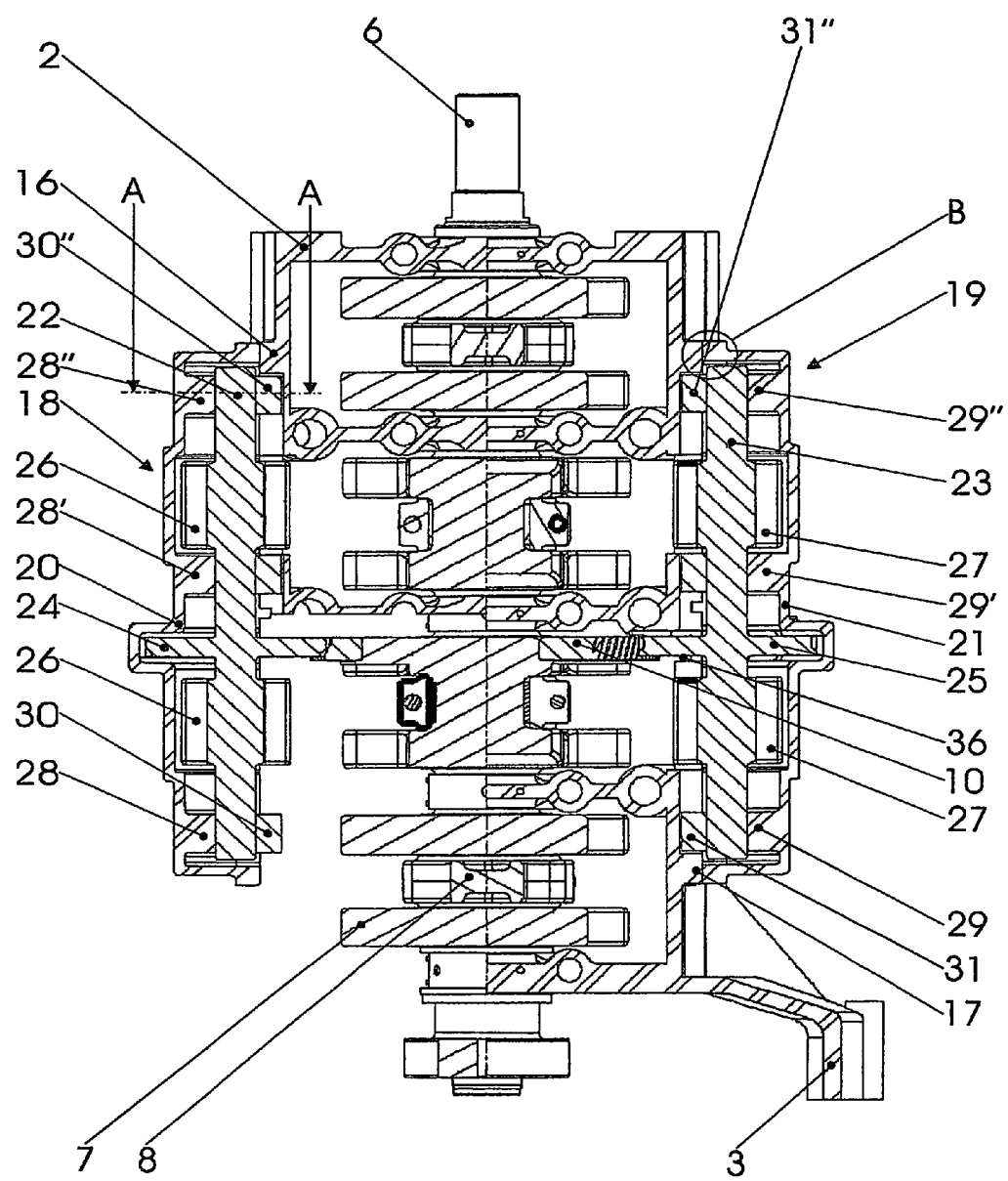
FIG. 5: a section according to EE in FIG. 2.
Figure 9:
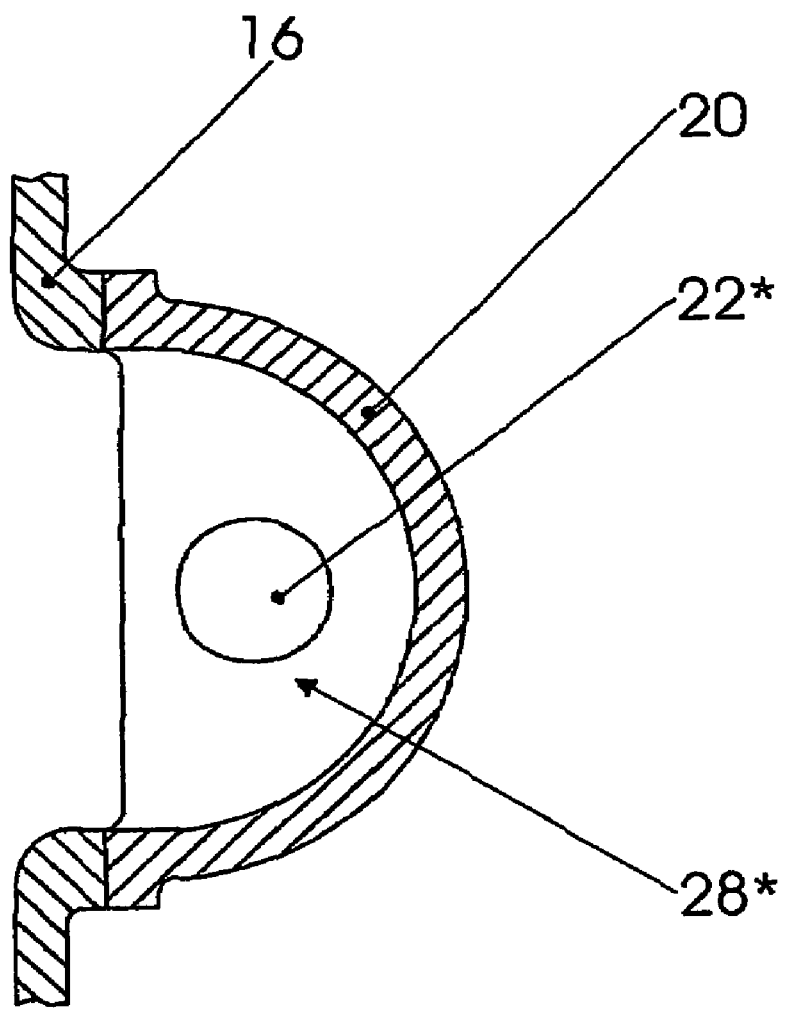
FIG. 9: a variant of FIG. 6.

In FIG. 5, the two balance shaft units 18, 19 are shown more precisely in a horizontal section. The left hand balance shaft unit 18 essentially consists of a housing 20 and a balance shaft 22 supported therein. Two balance weights 26 are on them and a gear 24 is rotationally fixedly attached between them or made integrally with the balance shaft 22. The balance shaft 22 is supported threefold in the housing 20, with the bearing halves fixed to the housing being designated with 28, 28' and 28" and bearing covers 30 being screwed onto the bearing halves fixed to the housing by means of bearing screws 32 (FIG. 6). Alternatively, the bearings can be made as closed bearings 28*, if the balance shaft unit is multi-part and balance weights and gear can be "threaded on" on the insertion of the balance shaft (22*) (FIG. 9).

The right hand balance shaft unit 19 substantially consists of a housing 21 and a balance shaft 23 supported therein. Two balance weights 27 are on them and a gear 25 is rotationally fixedly attached between them or made integrally with the balance shaft 23. The balance shaft 23 is supported threefold in the housing 21, with the bearing halves fixed to the housing being designated with 29, 29' and 29" and bearing covers 31 being screwed onto the bearing halves fixed to the housing. The gears 24, 25 and 34 project through windows 36 into the interior of the crankcase 2, where they mesh with the gear 20 fixed to the crankshaft. These windows can also be made so small that the gears can just project through; the structure of the crankcase 2 is thus practically not weakened.

In FIG. 3, the gears 24, 25 are shown on the balance shafts 22, 23 with their part circles. The left hand gear 24 meshes directly with the gear 10 fixed to the crankshaft. The right hand gear 25 meshes with an intermediate gear 34 on an intermediate shaft 35 and said intermediate gear with the gear 10 fixed to the crankshaft. In this connection, the engagement points 42, 43 with the gear 10 fixed to the crankshaft are indicated. Their connection line runs approximately through the axis 6' of the crankshaft 6; the engagement points 42, 43 therefore lie opposite one another, that is at a centering angle of approximately 180 degrees. For the precise setting of the engagement ratios in these engagement points 42, 43, the balance shaft units are displaceable in the vertical direction here on the flanges 16, 17 of the crankcase 2. The housings 20, 21 of the balance shaft units 18, 19 are displaceable for this purpose on the planar joint faces 40, 41 in these joint faces.

If the engagement ratios are thus set with the desired precision, the housings 20, 21 are tightened to the crankcase 2 by means of screws 70 (FIG. 1). To be able to do this independently of the precise position of the housings 20, 21, the passages provided at the housings 20, 21 for the passage of the screws 70 are made as elongate holes 71.

FIGS. 7 and 8 show a design measure which facilitates the setting of the engagement ratios. It ensures that the housings 20, 21 can only be displaced in a specific direction which is disposed in the normal plane through the crankshaft axis. For this purpose, a groove 66 for a key 65 is provided in the crankcase 2, said key being countersunk in a recess 67 of the housing 21 of the balance shaft unit. Conversely, the groove 66 could equally be provided in the housing 21. Guides of this type are preferably provided at both end walls of the housings 20, 21.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A piston engine comprising:
   a crankcase having a window formed therethrough and a flange surrounding said window to define a first joint face;
   a crankshaft rotatably supported in said crankcase, said crankshaft having a first gear seated thereon at said window;
   a balance unit housing secured to said crankcase, said balance unit housing having a second joint face abutting said first joint face; and
   a balance shaft rotatably supported in said balance unit housing, said balance shaft having a second gear seated thereon and projecting through said window to engage said first gear, wherein a gear clearance between said first gear and second gear is adjusted by displacing said balance unit housing on said first joint face.

2. The piston engine of claim 1, further comprising an intermediate shaft rotatably supported in said balance unit housing, said intermediate shaft having a third gear seated thereon and engaging a fourth gear seated on said balance shaft.

3. The piston engine of claim 1, further comprising a second balance shaft rotatably supported in said balance unit housing, said second balance shaft having a third gear seated thereon to project through said window and engage said first gear.

4. The piston engine of claim 3, further comprising an intermediate shaft supported in said balance unit housing, said intermediate shaft having a fourth gear seated thereon and engaging a fifth gear seated on said second balance shaft.

5. The piston engine of claim 3, wherein the second gear meshes with the first gear at a position mutually offset by approximately 180° from a position that the third gear meshes with the first gear.

6. The piston engine of claim 3, wherein said second joint face is formed at an obtuse angle relative to a crankshaft longitudinal axis and a balance shaft longitudinal axis in a section imaged normal to said crankshaft longitudinal axis.

7. The piston engine of claim 6, wherein said first and second joint faces are parallel to a plane of symmetry of said crankcase.

8. The piston engine of claim 1, further comprising a sliding guide interposed between said first and second joint faces for permitting displacement of said balance unit housing in a plane normal to said crankshaft.

9. The piston engine of claim 8, wherein said sliding guide comprises a groove formed in one of said first and second joint faces and a key let into another of said first and second joint faces.

10. The piston engine of claim 1, further comprising a pair of bearing assemblies rotatably supporting said balance shaft within said balance unit housing.

11. The piston engine of claim 10, wherein each of said bearing assemblies comprises a first bearing half disposed in said bearing unit housing and a second bearing half including a bearing cover connected to said first bearing half.

12. The piston engine in accordance with claim 10, wherein each of said bearing assemblies comprises an undivided bearing supported in said balance unit housing.

13. The piston engine in accordance with claim 1, wherein said second gear is centrally located along a length of said balance shaft.

14. A piston engine comprising:
a crankcase having a first window formed therethrough, a flange surrounding said first window to define a first joint face, a second window formed therethrough and a second flange surrounding said second window to define a second joint face;
a crankshaft rotatably supported in said crankcase, said crankshaft having a first gear seated thereon at said first and second windows;
a first balance unit assembly including:
a first housing secured to said crankcase, said first housing having a third joint face abutting said first joint face;
a first balance shaft rotatably supported in said first housing, said first balance shaft having a first balance shaft gear seated thereon and projecting through said first window to engage said first gear;
wherein a first gear clearance between said first gear and said first balance shaft gear is adjusted by displacing said first housing on said first joint face; and
a second balance unit including:
a second housing secured to said crankcase, said second housing having a fourth joint face abutting said second joint face;
a second balance shaft rotatably supported in said second housing, said second balance shaft having a second balance shaft gear seated thereon and projecting through said second window to engage said first gear;
wherein a second gear clearance between said first gear and said second balance shaft gear is adjusted by displacing said second housing on said second joint face.

15. The piston engine of claim 14, further comprising an intermediate shaft supported in said first housing, said intermediate shaft having an intermediate gear seated thereon and engaging a third balance shaft gear seated on said first balance shaft.

16. The piston engine of claim 14, wherein said third joint face and said fourth joint face are formed at an obtuse angle relative to a crankshaft longitudinal axis, a first balance shaft longitudinal axis and a second balance shaft longitudinal axis in a section imaged normal to said crankshaft longitudinal axis.

17. The piston engine of claim 16, wherein said first and second joint faces are parallel to a plane of symmetry of said crankcase.

18. The piston engine in accordance with claim 14, further comprising a first sliding guide interposed between said first and third joint faces for permitting displacement of said first housing in a plane normal to said crankshaft, and a second sliding guide interposed between said second and fourth joint faces for permitting displacement of said second housing in a plane normal to said crankshaft.

19. The piston engine in accordance with claim 18, wherein said first and second sliding guides comprise a first groove formed in said first joint face, a second groove formed in said second joint face, a first key let into said third joint face and extending into said first groove and a second key let into said fourth joint face and extending into said second groove.

20. The piston engine in accordance with claim 14, wherein the first balance shaft gear meshes with said first gear at a position mutually offset by approximately 180° from a position that said second balance shaft gear meshes with said first gear.

21. A piston engine comprising at least one balance shaft unit in whose crankcase a crankshaft is supported and at whose crankcase a window surrounded by a flange is provided at the side, with the flange forming a joint face to which the housing of the balance shaft unit is fastened by means of screws, with a balance shaft being supported in said housing, wherein the balance shaft has a gear, which projects through the window into the interior of the crankcase, and which is driven by a gear seated on the crankshaft, and wherein the housing of the balance shaft unit has a joint face, which is displaceable on the joint face of the crankcase for the setting of the gear clearance before the screws are tightened.

22. A piston engine in accordance with claim 21, wherein a second balance shaft unit is provided in whose housing a further intermediate shaft is supported in addition to a second balance shaft with an intermediate gear which meshes, on the one hand, with the gear of the balance shaft and, on the other hand, with the gear seated on the crankshaft.

23. A piston engine in accordance with claim 21, wherein the joint face includes an obtuse angle with the connection straight line of the axes of the crankshaft and the balance shaft in a section imagined normal to the crankshaft axis.

24. A piston engine in accordance with claim 23, wherein the joint faces are parallel to the plane of symmetry of the engine.

25. A piston engine in accordance with claim 21, wherein at least one sliding guide is provided in the joint faces of the crankcase and of the housing of the balance shaft unit and permits a displacement in a plane normal to the crankshaft.

26. A piston engine in accordance with claim 21, wherein the sliding guide comprises a straight groove in the sliding direction in the joint face and of a key let into the joint face.

27. A piston engine in accordance with claim 21, wherein the balance shaft runs around in divided bearings in its housing with the one bearing half being formed in the housing of the balance shaft unit and the other being made as a bearing cover connected to the first bearing half.

28. A piston engine in accordance with claim 21, wherein the balance shaft runs around in undivided bearings in its housing.

29. A piston engine in accordance with claim 21, wherein the gear of the balance shaft is arranged at its center.

30. A piston engine in accordance with claim 22, wherein the gear of the first balance shaft unit and the intermediate gear of the second balance shaft unit mesh with the gear seated on the crankshaft at positions mutually offset by 180 degrees.

* * * * *